United States Patent [19]

Luna

[11] Patent Number: 5,516,152
[45] Date of Patent: May 14, 1996

[54] ALPHANUMERICA QUICK SYMBOL GUIDE

[76] Inventor: Roberto F. Luna, 311 Ave. Cabrillo, San Clemente, Calif. 92672

[21] Appl. No.: 296,960

[22] Filed: Aug. 26, 1994

[51] Int. Cl.⁶ .................................................. G09B 11/00
[52] U.S. Cl. .............................. 283/45; 283/46; 283/117
[58] Field of Search ................... 283/44, 45, 46, 283/66.1, 115, 117

[56] References Cited

U.S. PATENT DOCUMENTS

| | | | |
|---|---|---|---|
| 155,726 | 10/1874 | Howson | 283/45 |
| 229,404 | 6/1880 | Hamilton | 283/45 |
| 1,145,512 | 7/1915 | Reed | 283/45 |
| 4,173,082 | 11/1979 | Niquette | 283/45 X |

*Primary Examiner*—Willmon Fridie, Jr.
*Attorney, Agent, or Firm*—Michael I. Kroll

[57] ABSTRACT

An alphanumeric quick symbol guide is provided comprising a sheet and an array for forming on the sheet any letter of an alphabet, any number and any sign symbol for display purposes.

14 Claims, 4 Drawing Sheets

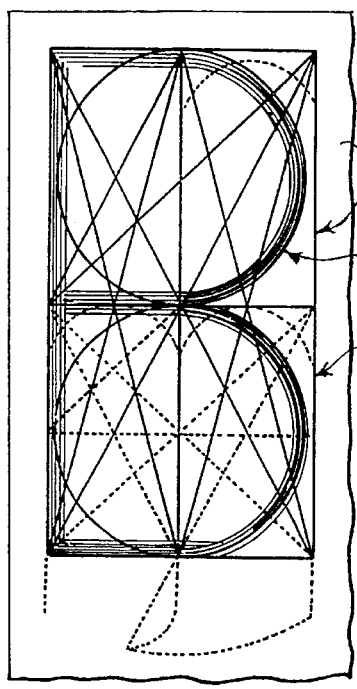
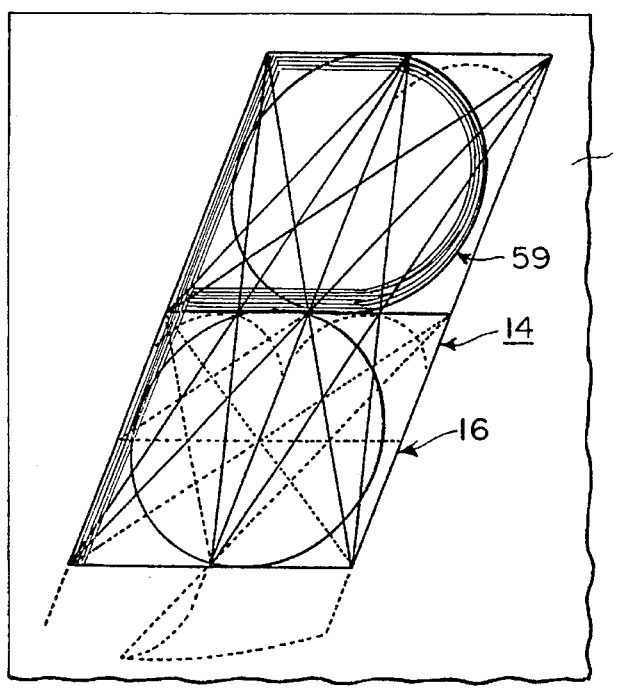
Fig. 3  Fig. 3A
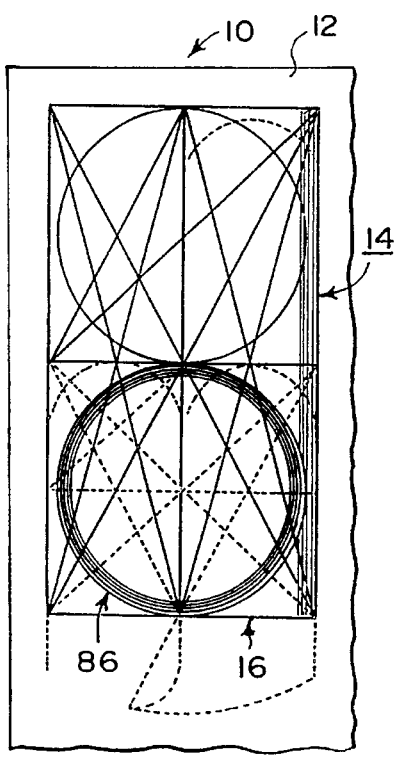
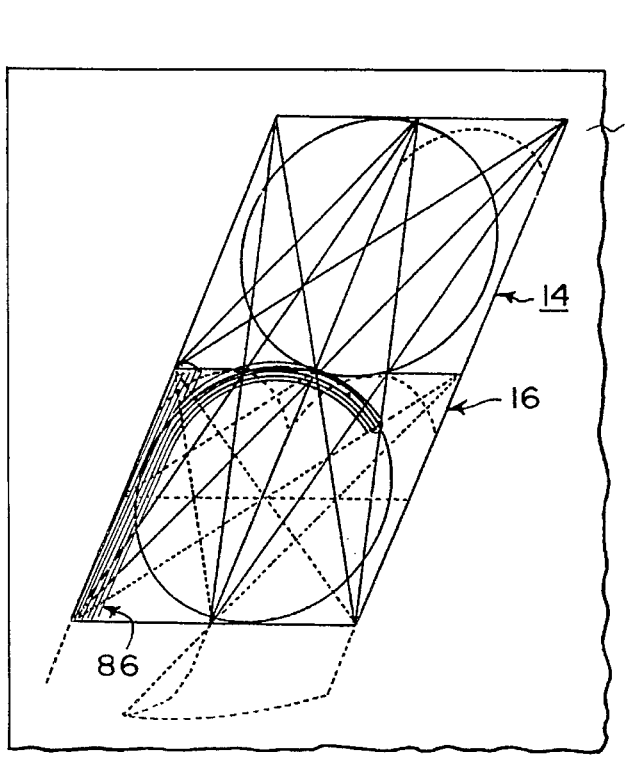
Fig. 4  Fig. 4A

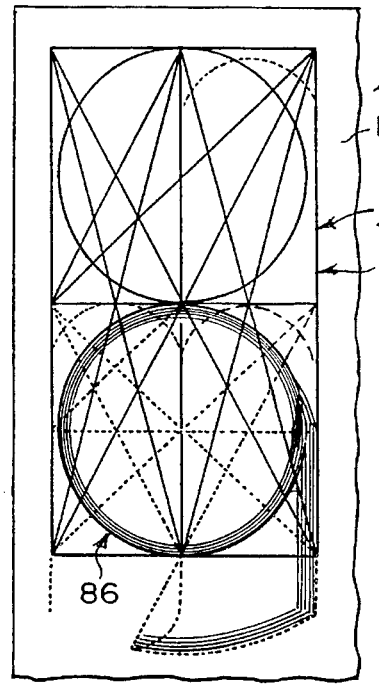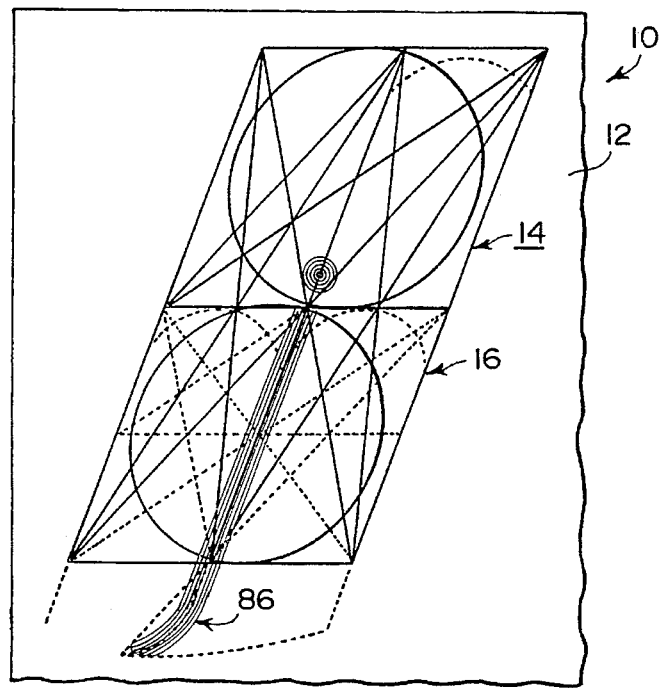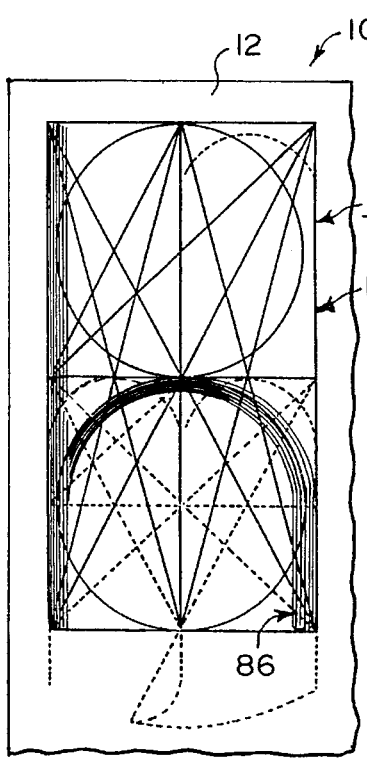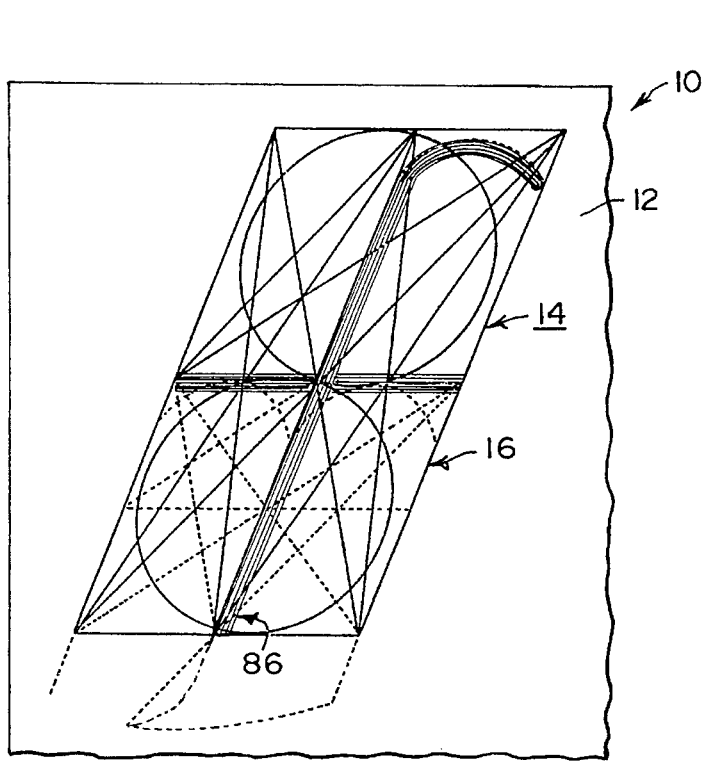

ALPHANUMERICA QUICK SYMBOL GUIDE

BACKGROUND OF THE INVENTION

1. Field of the Invention

The instant invention relates generally to display signs and more specifically it relates to an alphanumeric quick symbol guide.

2. Description of the Prior Art

Numerous display signs have been provided in prior art. For example U.S. Pat. Nos. 1,021,189 to Hill; 1,279,241 to Brouse; 2,137,360 to Skelsey; 2,922,993 to Sack; 4,024,532 to Sherwin; 4,509,279 to Greenberger; 4,672,759 to Docherty et al. and 4,838,792 to Hoyeck all are illustrative of such prior art. While these units may be suitable for the particular purpose to which they address, they would not be as suitable for the purposes of the present invention as heretofore described.

HILL, IRVING

ALPHABETICAL SYMBOLS

U.S. Pat. No. 1,021,189

A designating basic form for making symbols for numerals or letters, comprising a square divided into a plurality of points and lines projected to all aligned points.

BROUSE, JOHN M

LETTERING GUIDE

U.S. Pat. No. 1,279,241

A character forming guide comprising a sheet, a circle described thereon and parallel lines applied to the sheet. One of the lines is tangent with the top of the circle, another tangent with the base of the circle and the other describing the diameter of the circle. A vertical line passes diametrically through the circle. A side line passing across the circle is parallel with the vertical diametrical line and is spaced at equal distances therefrom. Limb lines passing across the circle are parallel with the vertical diametrical line and are spaced at equal distances therefrom.

SKELSEY, ALFRED CHARLES

ILLUMINATED ADVERTISING SIGN

U.S. Pat. No. 2,137,360

An advertising sign includes a plurality of lamps arranged within compartments in a light controlling chamber. A frame has character defining strips forming character sections and is arranged in front of the compartments. A plurality of lamps are positioned in the compartments immediately behind certain strips of the character defining frame, so as to be common, each to two or more character forming sections of the frame. Other lamps are individual to specific sections of the frame.

SACK JR., EDGAR A.

DISPLAY DEVICE

U.S. Pat. No. 2,922,993

A digital display device for forming in a pre-selected manner any numerical digit, comprising a first electrode means. A composite second electrode means is spaced proximate to, but apart from, the first electrode means. At least one of the electrode means is light transmitting. Seven substantially-straight electrically-conductive principal members electrically insulated from one another comprises the second electrode means. A material comprises electroluminescent phosphor means between the first electrode means and the principal members. A substantially straight-sided composite figure eight is formed by the principal members. The figure eight comprises two substantially parallel and spaced riser portions substantially bridged at locations proximate their ends and midpoints by substantially parallel and spaced transverse portions. Each of the riser portions of the figure eight comprises two of the principal members which are spaced slightly apart and disposed in substantially straight-line configuration. The transverse portions of the figure eight are formed by the remaining three of the principal members. The first electrode means and pre-selected combinations of the principal members are adapted to have an electrical potential applied thereacross to create electric fields therebetween. Electroluminescent phosphor portions within the influence of the resulting electric fields cause the corresponding pre-selected portions of the composite figure eight to be illuminated.

SHERWIN, RICHARD N.

CHARACTER MODULE FOR AUTOMATIC SIGN

U.S. Pat. No. 4,024,532

A reflective type module for remotely controlled sign displays provides a plurality of linear elements adapted for forming the Latin alphabet and Arabic numerals. Each element is controlled by a two position electro-mechanical motor to be rotatably moved to a visual or non-visual state in response to an electrical signal. Each module is self-contained and individually encased.

GREENBERGER, WILLIAM

INTERCHANGEABLE DIGITAL DISPLAY SIGN

U.S. Pat. No. 4,509,279

This invention relates to a display device that may be constructed from a single sheet of resilient material having a plurality of color contrasting portions that may be displayed in various combinations to form a desired character, e.g. numeral, or the like.}

DOCHERTY, BRIAN

LAMBLEY, STEPHEN

ALPHABETIC DISPLAY

U.S. Pat. No. 4,672,759

Digits of multi digit alphanumeric display have eight segments, via a conventional seven segment arrangement plus an eighth. The attitude/position of the eighth segment differs from digit to digit. The pattern of variation being selected, so that a limited repertoire of words and phrases can be displayed without the provision of full alphanumeric capability on all digits.

HOYECK, RALPH H.

ONE LETTER ALPHABET (OLA)

U.S. Pat. No. 4,838,792

The present invention deals with guided writing and variable displays, for sign, illustrations, etc., using (a) Guiding points at the main intersections of the lines of a common symbol representing a group of symbols, letters or figures, etc., and display means in between. (b) Holding means at the guiding points and tie lines in between. (c) Grooves, raised tracks, magnetic tracks, stretched strings, etc., in between the guiding points and fillers, coverings, markings, etc., along the lines of the symbols to be displayed. (d) Colorless markings or grooves as in (c) and pen markings over the selected symbols. (e) Bars, inking elements, etc., in between the guiding points, connected to various command centers to print or display the required symbols. (f) Series of lights on electric wires in between the guiding points, activated by various command centers. (g) Light sources located at the guiding points described in (a) and projecting in between, along the lines of the characters to be displayed.

SUMMARY OF THE INVENTION

A primary object of the present invention is to provide an alphanumeric quick symbol guide that will overcome the shortcomings of the prior art devices.

Another object is to provide an alphanumeric quick symbol guide that consists of a sheet with a geometric graphic pattern thereon, to allow a person to make any letter of the alphabet, any number and any sign symbol by tracing a specific shaped outline thereupon.

An additional object is to provide an alphanumeric quick symbol guide, in which the geometric graphic pattern has various lines and curves superimposed thereon, to help the person to trace the specific shaped outline thereupon.

A further object is to provide an alphanumeric quick symbol guide that is simple and easy to use.

A still further object is to provide an alphanumeric quick symbol guide that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a plan view similar to FIG. 2, showing an upper case letter B made thereupon.

FIG. 3A is a plan view similar to FIG. 2A showing an upper case italic letter P made thereupon.

FIG. 4 is a plan view similar to FIG. 3, showing a lower case letter d made thereupon.

FIG. 4A is a plan view similar to FIG. 3A, showing a lower case italic letter r made thereupon.

FIG. 5 is a plan view similar to FIG. 4, showing a lower case letter g made thereupon.

FIG. 5A is a plan view similar to FIG. 4A, showing a lower case italic letter j made thereupon.

FIG. 6 is a plan view similar to FIG. 5, showing a lower case letter h made thereupon.

FIG. 6A is a plan view similar to FIG. 5A, showing a lower case italic letter f made thereupon.

DETAILED DESCRIPTION OF THE PREFERRED EMBODIMENTS

Figure 1:
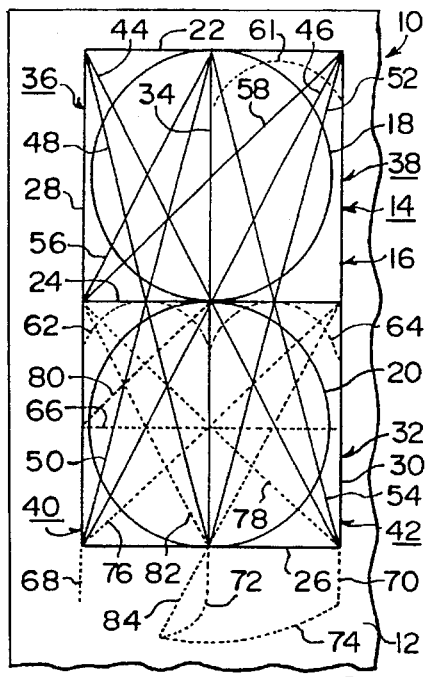
FIG. 1 is a plan view of the instant invention.

Turning now descriptively to the drawings, in which similar reference characters denote similar elements throughout the several views, FIGS. 1 through 8 illustrate an alphanumeric quick symbol guide 10, comprising a sheet 12 and an array 14 for forming on the sheet 12 any letter of an alphabet, any number and any sign symbol for display purposes. The forming array 14 is a geometric graphic pattern 16, having lines and curves superimposed thereon, so as to make any letter of the alphabet, any number and any sign symbol by a person tracing a specific shaped outline thereupon.

The geometric graphic pattern 16 includes two circles 18, 20, one above the other. Three parallel horizontal lines 22, 24, 26 are provided. The first upper horizontal line 22 is tangent with the top of the upper circle 18. The second middle horizontal line 24 is tangent with the bottom of the upper circle 18 and the top of the lower circle 20. The third lower horizontal line 26 is tangent with the bottom of the lower circle 20. Three parallel vertical lines 28, 30, 34 are also provided. The two right and left side vertical lines 28, 30 are boarded at their opposite ends with the first upper horizontal line 22 and the third lower horizontal line 26, while slightly spaced away from the sides of the two circles 18, 20, to form a rectangular configuration 32. The third central vertical line 34 intersects the two circles 18, 20 and the three horizontal lines 22, 24, 26 at their middle points, so that the rectangular configuration 32 is divided into four segments 36, 38, 40, 42.

A first set of two diagonal lines 44, 46 extend between four corners of the rectangular configuration 32. A second set of two diagonal lines 48, 50 extend between four corners of the left side of the rectangular configuration 32 constituting the first segment 36 and the third segment 40. A third set of two diagonal lines 52, 54 extend between four corners of the right side of the rectangular configuration 32 constituting the second segment 38 and the fourth segment 42.

Figure 2:
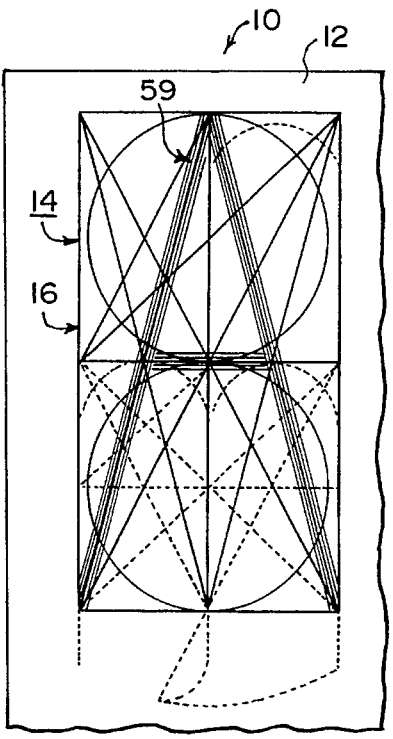
FIG. 2 is a plan view similar to FIG. 1, showing an upper case letter A made thereupon.
Figure 2A:
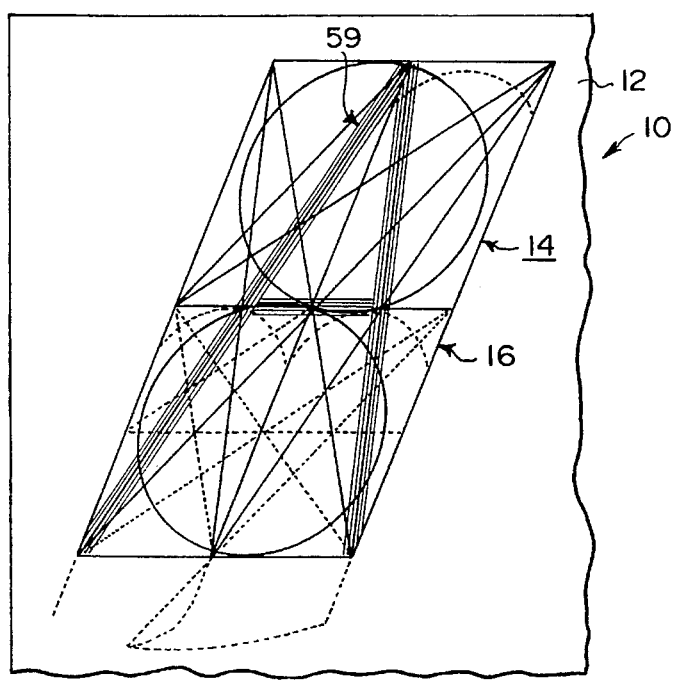
FIG. 2A is a plan view similar to FIG. 1A, showing an upper case italic letter A made thereupon.
Figure 8:
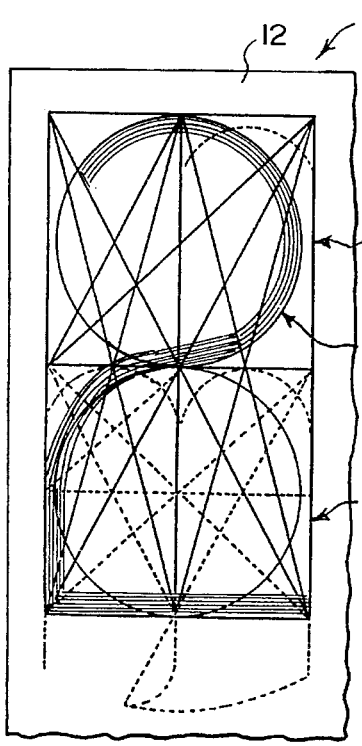
FIG. 8 is a plan view similar to FIG. 7, showing a number 2 made thereupon.
Figure 8A:
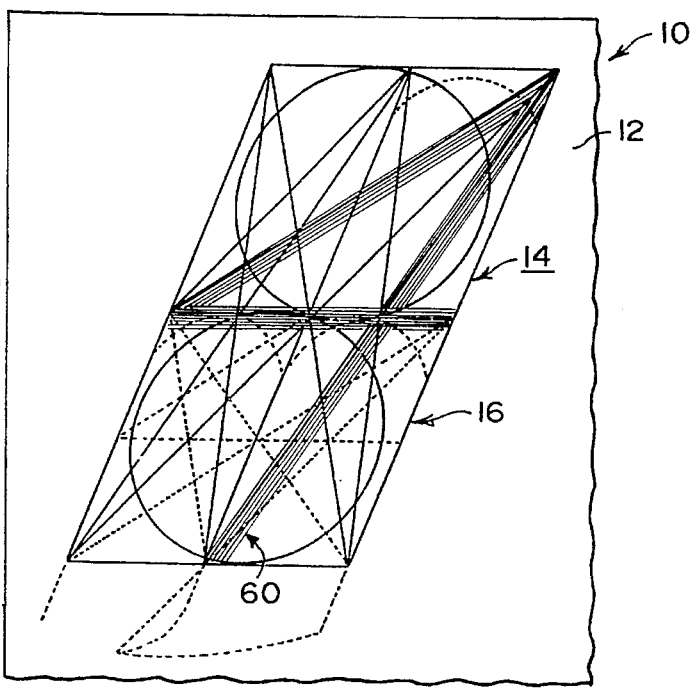
FIG. 8A is a plan view similar to FIG. 7A, showing an italic number 4 made thereupon.

A first diagonal line 56 extends between a lower left corner and an upper right corner of the first segment 36 of the rectangular configuration 32. A second diagonal line 58 extends between the lower left corner of the first segment 36 and an upper right corner of the second segment 38 of the rectangular configuration 32. Any character of any upper case letter 59, of the alphabet, as shown in FIGS. 2 and 3 and any number 60, as shown in FIG. 8, can be formed thereon by tracing its shape with a writing instrument.

The geometric graphic pattern 16 further contains a first dotted arc line 61 located within the second segment 38 of the rectangular configuration 32 and is spaced below the first upper horizontal line 22. A second dotted arc line 62 is located within the third segment 40 of the rectangular configuration 32 and is tangent with the second middle horizontal line 24. A third dotted arc line 64 is located within the fourth segment 42 of the rectangular configuration 32 and is tangent with the second middle horizontal line 24.

A horizontal dotted line 66 passes through the center of the lower circle 20 between the right and left side vertical lines 28, 30. Two parallel short vertical dotted lines 68, 70 are provided. The first vertical dotted line 68 extends downwardly from a lower left corner of the third segment 40. The second vertical dotted line 70 extends downwardly from a lower right corner of the fourth segment 42 of the rectangular configuration 32. A J-shaped vertical dotted line 72 extends downwardly from the intersection of the lower right corner of the third segment 40 and the lower left corner of the fourth segment 42, of the rectangular configuration 32. A generally horizontal concave dotted line 74 extends between a distal end of the second vertical dotted line 70 and a distal end of the J-shaped vertical dotted line 72.

Figure 7:
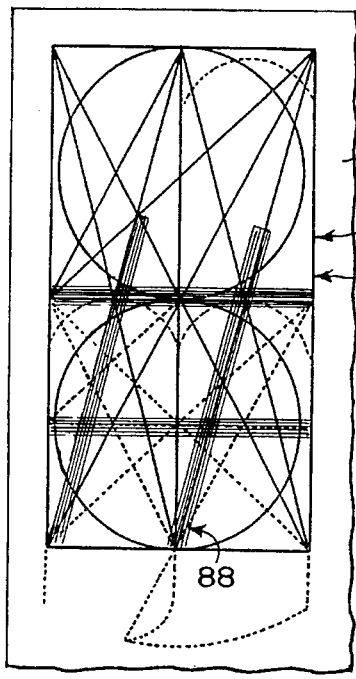
FIG. 7 is a plan view similar to FIG. 6, showing a number sign symbol made thereupon.
Figure 7A:
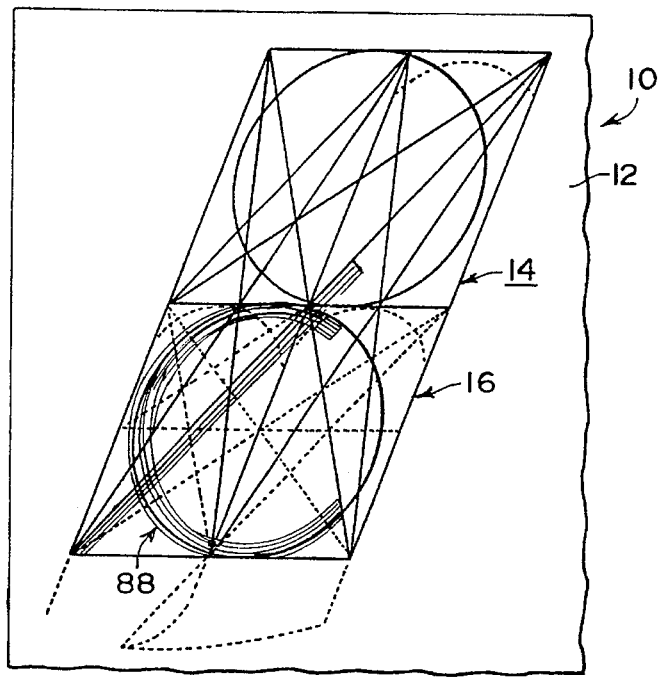
FIG. 7A is a plan view similar to FIG. 6A, showing an italic cents sign symbol made thereupon.

A set of two diagonal dotted lines 76, 78 extend between the four corners of a bottom portion of the rectangular configuration 32 constituting the third segment 40 and the fourth segment 42. A first diagonal dotted line 80 extends between the intersection of the horizontal dotted line 66 with the left side vertical line 28 and the upper right corner of the third segment 40 of the rectangular configuration 32. A second diagonal dotted line 82 extends between the lower right corner to an upper left corner of the third segment 40 of the rectangular configuration 32. A third diagonal dotted line 84 extends between the distal end of the J-shaped vertical dotted line 72 through the intersection of the lower right corner of the third segment 40 and the lower left corner of the fourth segment 42 to the upper right corner of the fourth segment 42 of the rectangular configuration 32. Any character of any lower case letter 86 of the alphabet, as shown in FIGS. 4, 5 and 6, and any sign symbol 88, as shown in FIG. 7, can be formed thereon, by tracing its shape with a writing instrument.

As shown in FIGS. 1A through 8A, all of the vertical lines of the geometric graphic pattern 16 are tilted at an angle to the right. Any upper case letter 59, any lower case letter 86 of the alphabet, any number 60 and any sign symbol 88 made by the person tracing the specific shaped outline thereupon will be of an italic type.

The sheet 12 can be a piece of paper, a poster board, or of an exterior sign material, such as typically sintra PVC. The sheet 12 can also be a thin piece of polystyrene material, a thin piece of plastic material or a bumper sticker. The sheet can be any interior or exterior sign material surface used for display purposes.

The lines and curves of the geometric graphic pattern 16 may be thin and/or light as in graph paper. This would make the lines and curves undetectable at a distance which is preferred, but detectable for tracing and/or guidance. In case the sheet 12 has a non-white background, the lines and curves could be of an opposite and/or distinguishing color.

Figure 1A:
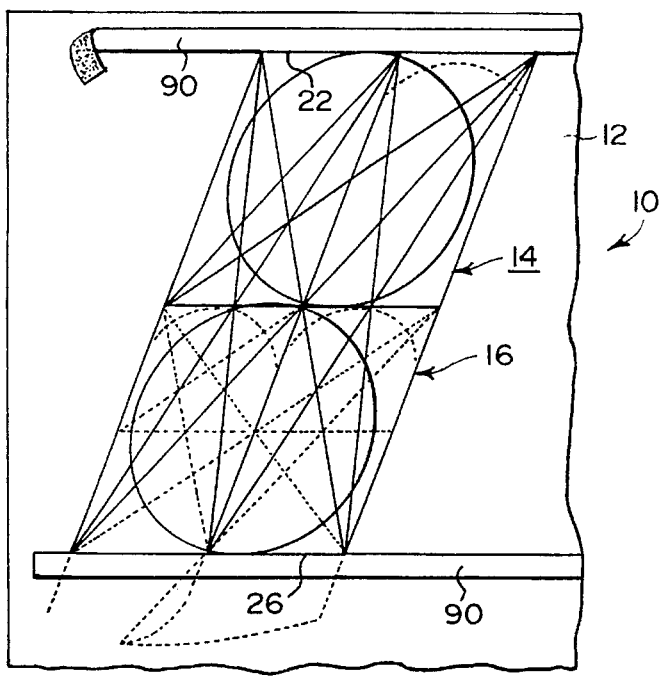
FIG. 1A is a plan view of a modification for making italic letters of the alphabet, numbers and sign symbols.

As shown in FIG. 1A, adhesive strips 90 can be placed along the first upper horizontal line 22 and the third lower horizontal line 26. A series of the geometric graphic patterns 16 are normally arranged side by side in a row. After a message is traced upon the sheet 12, the adhesive strips 90 are removed from the sheet 12, with the results being neat, straight edges along the first upper horizontal line 22 and the third lower horizontal line 26. The adhesive strips 90 can be made as a roll of tape, which could be placed onto the sheet 12 at production, or made available for a person to place on the sheet 12.

LIST OF REFERENCE NUMBERS 10 alphanumeric quick symbol guide
12 sheet
14 forming array
16 geometric graphic pattern for 14
18 upper circle
20 lower circle
22 first upper horizontal line
24 second middle horizontal line
26 third lower horizontal line
28 first left side vertical line
30 second right side vertical line
32 rectangular configuration
34 third central vertical line
36 first segment of 32
38 second segment of 32
40 third segment of 32
42 fourth segment of 32
44 diagonal line
46 diagonal line
48 diagonal line
50 diagonal line
52 diagonal line
54 diagonal line
56 diagonal line
58 diagonal line
59 upper case letter
60 number
61 first dotted arch line
62 second dotted arc line
64 third dotted arc line
66 horizontal dotted line
68 first short vertical dotted line
70 second short vertical dotted line
72 J-shaped vertical dotted line
74 generally horizontal concave dotted line
76 diagonal dotted line
78 diagonal dotted line
80 diagonal dotted line
82 diagonal dotted line
84 diagonal dotted line
86 lower case letter 88 sign symbol
90 adhesive strip It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An alphanumeric quick symbol guide comprising:
   a) a sheet; and
   b) means for forming on said sheet any letter of an alphabet, any number and any sign symbol for display purposes, said forming means being a geometric graphic pattern, having lines and curves superimposed thereon, so as to make any letter of the alphabet, any number and any sign symbol by a person tracing a specific shaped outline thereupon, said geometric graphic pattern including two circles, one above the other, three parallel horizontal lines, in which said first upper horizontal line is tangent with the top of said upper circle, said second middle horizontal line is tangent with the bottom of said upper circle and the top of said lower circle, while the third lower horizontal line is tangent with the bottom of said lower circle, three parallel vertical lines, in which said two right and left side vertical lines are boarded at their opposite ends with said first upper horizontal line and said third lower horizontal line, while slightly spaced away from the sides said two circles to form a rectangular configuration, while said third central vertical line intersects said two circles and said three horizontal lines at their middle points, so that said rectangular configuration is divided into four segments, a first set of two diagonal lines extending between four corners of said rectangular configuration, a second set of two diagonal lines extending between four corners of the left side of said rectangular configuration constituting said first segment and said third segment, a third set of two diagonal lines extending between four corners of the right side of said rectangular configuration constituting said second segment and said fourth segment, a first diagonal line extending between a lower left corner and an upper right corner of said first segment of said rectangular configuration, and a second diagonal line extending between the lower left corner of said first segment and an upper right corner of said second segment of said rectangular configuration, so that any character of any upper case letter of the alphabet and any number can be formed thereon by tracing its shape with a writing instrument.

2. An alphanumeric quick symbol guide as recited in claim 3, wherein said geometric graphic pattern further includes:
   a) a first dotted arc line located within said second segment of said rectangular configuration and spaced below said first upper horizontal line;
   b) a second dotted arc line located within said third segment of said rectangular configuration and tangent with said second middle horizontal line;
   c) a third dotted arc line located within said fourth segment of said rectangular configuration and tangent with said second middle horizontal line;
   d) a horizontal dotted line passing through the center of said lower circle between said right and left side vertical lines;
   e) two parallel short vertical dotted lines, in which said first vertical dotted line extends downwardly from a lower left corner of said third segment and said second vertical dotted line extends downwardly from a lower right corner of said fourth segment of said rectangular configuration;
   f) a J-shaped vertical dotted line extending downwardly from the intersection of the lower right corner of said third segment and said lower left corner of said fourth segment of said rectangular configuration;
   g) a generally horizontal concave dotted line extending between a distal end of said second vertical dotted line and a distal end of said J-shaped vertical dotted line;
   h) a set of two diagonal dotted lines extending between the four corners of a bottom portion of said rectangular configuration constituting said third segment and said fourth segment;
   i) a first diagonal dotted line extending between the intersection of said horizontal dotted line with said left side vertical line and the upper right corner of said third segment of said rectangular configuration;
   j) a second diagonal dotted line extending between the lower right corner to an upper left corner of said third segment of said rectangular configuration; and
   k) a third diagonal dotted line extending between the distal end of said J-shaped vertical dotted line through the intersection of the lower right corner of said third segment and said lower left corner of said fourth segment to the upper right corner of said fourth segment of said rectangular configuration, so that any character of any lower case letter of the alphabet and any sign symbol can be formed thereon, by tracing its shape with a writing instrument.

3. An alphanumeric quick symbol guide as recited in claim 2, wherein all said vertical lines of said geometric graphic pattern are tilted at an angle to the right, so that any upper case letter, any lower case letter of the alphabet, any number and any sign symbol made by the person tracing the specific shaped outline thereupon will be of an italic type.

4. An alphanumeric quick symbol guide as recited in claim 3, wherein said sheet is a piece of paper.

5. An alphanumeric quick symbol guide as recited in claim 3, wherein said sheet is a poster board.

6. An alphanumeric quick symbol guide as recited in claim 3, wherein said sheet is an exterior sign material, such as typically sintra PVC.

7. An alphanumeric quick symbol guide as recited in claim 3, wherein said sheet is a thin piece of polystyrene material.

8. An alphanumeric quick symbol guide as recited in claim 3, wherein said sheet is a thin piece of plastic material.

9. An alphanumeric quick symbol guide as recited in claim 3, wherein said sheet is a bumper sticker.

10. An alphanumeric quick symbol guide as recited in claim 3, wherein said sheet is any interior/exterior sign material surface used for display purposes.

11. An alphanumeric quick symbol guide as recited in claim 3, wherein said lines and said curves of said geometric graphic pattern may be thin and light as in graph paper, so that this would make said lines and said curves undetectable at a distance which is preferred, but detectable for tracing and guidance.

12. An alphanumeric quick symbol guide as recited in claim 3, whereby in case said sheet has a non-white background, said lines and said curves could be of an opposite and distinguishing color.

13. An alphanumeric quick symbol guide as recited in claim 3, further including adhesive strips that can be placed along said first upper horizontal line and said third lower horizontal line, when a series of said geometric graphic patterns are normally arranged side by side in a row, so that after a message is traced upon said sheet, said adhesive strips are removed from said sheet, with the results being neat, straight edges along said first upper horizontal line and said third lower horizontal line.

14. An alphanumeric quick symbol guide as recited in claim 13, wherein said adhesive strips can be made as a roll of tape, which could in a first instance be placed onto said sheet at production and in a second instance be made available for a person to place on said sheet.

* * * * *